Patented Jan. 1, 1935

1,986,091

UNITED STATES PATENT OFFICE 1,986,091

PRODUCTION OF BASIC ALUMINUM SULPHATE

Robert Odiorne Wood, Hamburg, N. Y., assignor to National Aniline & Chemical Co. Inc., New York, N. Y., a corporation of New York No Drawing. Application July 22, 1929, Serial No. 380,248

5 Claims. (Cl. 23—124)

This invention relates to a process for the production of a basic aluminum sulphate and more particularly to the production of such a sulphate through the utilization of aluminum compounds as a by-product in the production of organic compounds by the Friedel-Crafts reaction.

It is an object of the invention to provide a process whereby a basic aluminum sulphate may be obtained from an aluminum-containing Friedel-Crafts reaction by-product in a condition of high purity and substantially free from iron.

Another object of the invention is to provide a process for recovering the aluminum from waste aluminum-containing products in a manner which is simple, efficient, and of low cost on a commercial scale.

Other objects of the invention will in part be obvious and will in part appear hereinafter.

The invention accordingly comprises the several steps of the process and the relation of one or more of such steps with respect to each of the others thereof, and will be exemplified in the process hereinafter disclosed. The scope of the invention will be indicated in the specification and claims.

Condensations conducted according to the Friedel-Crafts reaction, wherein aluminum chloride is used as a condensing agent, give a by-product containing aluminum, which by-product is generally considered as a waste material. This waste material may contain the aluminum as a soluble salt or as an insoluble salt or hydrate, depending upon the particular process utilized in isolating the condensation product from the reaction mass.

In the production of an aroyl-o-benzoic acid by the condensation, in the presence of aluminum chloride, of phthalic anhydride, or a derivative thereof, with an aromatic hydrocarbon or a derivative thereof, e. g., benzene, toluene, chlorbenzene, naphthalene, etc., there is obtained a reaction mass containing the aluminum chloride compound of the aroyl-o-benzoic acid produced which is generally subsequently decomposed in one of two ways. It may be treated with sodium carbonate, usually in the presence of water, to convert the aluminum into an insoluble hydrate or basic carbonate which is removed as a by-product from the solution which contains the liberated aroyl-o-benzoic acid as the sodium salt, or it may be treated with an acid, e. g., hydrochloric acid, sulphuric acid, etc., to convert the aluminum into a soluble salt which is separated from the insoluble aroyl-o-benzoic acid which is liberated. The aluminum-containing by-products so obtained usually contain iron in an amount which, if not removed, will discolor the basic aluminum sulphate prepared therefrom.

In the practice of the invention, a basic aluminum sulphate which is substantially free from iron may be prepared from aluminum-containing by-products. The process by which the basic aluminum sulphate may be prepared varies somewhat according to the manner in which the by-product arose. In general, the process comprises the production of a solution containing an aluminum compound, and, after removal of any insoluble material, neutralizing the solution in the presence of a soluble sulphate to an extent necessary to precipitate basic aluminum sulphate.

As one manner of practicing the invention, the aluminum by-product of a Friedel-Crafts reaction previously regarded as a waste material, either in the form of a soluble compound, for example, aluminum chloride, or of an insoluble compound, for example, basic aluminum carbonate, may be converted into an alkali-metal aluminate by treatment with caustic alkali. The solution containing the alkali metal aluminate may then be neutralized by the addition of sulphuric acid thereto to an extent necessary to precipitate the desired basic aluminum sulphate. By the foregoing treatment, any iron present in the by-product is rendered insoluble or is not dissolved by the treatment with caustic alkali, and may be removed from the alkali metal aluminate solution in any suitable manner, as by filtration before addition of sulphuric acid thereto.

According to another modification of the invention, to a solution containing a salt of aluminum there may be added sulphuric acid or other soluble sulphate in an amount sufficient to permit the formation of basic aluminum sulphate in the subsequent treatment of the solution with alkali. An alkali may be then added to precipitate basic aluminum sulphate.

When the waste material is obtained in a solution in sulphuric acid, then the basic aluminum sulphate may be prepared by adding the proper amount of alkali to the solution. Furthermore, I have found that a satisfactory basic aluminum sulphate substantially free from iron may be obtained by precipitation from a solution which contains iron and which has a hydrogen ion concentration of from about pH 3.5 to about pH 6. The preferred hydrogen ion concentration is that of about pH 5.8. From the foregoing it will be understood that waste materials containing aluminum, such as, aluminum hydroxide and basic aluminum carbonate, may with facility be dissolved in a mineral acid and then be treated according to the foregoing procedure.

As illustrative embodiments of a manner in which the invention may be carried out in practice, the following examples are presented:

*Example 1.*—200 volumes of a waste aluminum chloride solution containing about 15 per cent by weight of aluminum chloride (produced, for example, as a by-product in the condensation of phthalic anhydride with chlorbenzene in the presence of anhydrous aluminum chloride and subsequently decomposing the reaction mass with dilute hydrochloric acid and removing the precipitated chlorbenzoyl-o-benzoic acid), 80 volumes of a 47 per cent solution of caustic soda, and 400 volumes of water are mixed and heated to about 80° C., whereby sodium aluminate is produced and the soluble iron compounds present in the aluminum chloride solution are rendered insoluble. The insoluble matter, consisting mostly of iron compounds and organic matter, is filtered off. The filtrate is then neutralized with sulphuric acid using methyl red test paper as an indicator and the basic aluminum sulphate which is precipitated is filtered off, washed and dried. The point of neutralization is indicated by the first appearance of orange on the test paper.

*Example 2.*—1000 parts, by weight, of the basic aluminum press cake (obtained, for example, as a by-product in the condensation of phthalic anhydride with benzene as disclosed in German Patent No. 75,288 and containing about 8 per cent combined aluminum) is admixed with 2000 parts water at 60° C. 338 parts of a 47 per cent caustic soda solution are then added. The admixture is agitated until the aluminum salt is dissolved. The iron present remains as an insoluble residue, which is filtered off immediately to avoid hydrolysis of sodium aluminate. The filtrate is diluted to 6000 parts with cold water and neutralized by addition of sulphuric acid, using methyl red as an indicator. Basic aluminum sulphate precipitates, and is washed by decantation, filtered and dried.

*Example 3.*—200 parts, by weight, of the aluminum press cake mentioned in Example 2 is mixed with 400 parts of the waste aluminum chloride solution mentioned in Example 1 and with 250 parts of water, and the mixture is heated to about 75° C. Due to the presence of a large proportion of free hydrochloric acid in the waste aluminum chloride solution, the press cake dissolves. The mixture is filtered hot to remove any organic matter which may be present. "Filtercel" may be added to aid filtration. To the filtrate, there is then added that quantity of sulphuric acid necessary to combine with the aluminum present in solution to form the basic sulphate as determined by analysis of a sample portion. Any iron originally present in the waste aluminum products will be present in this filtrate. The solution is made up of 7000 parts with water and is neutralized with a solution of sodium carbonate, using bromcresol green as an indicator, whereupon basic aluminum sulphate precipitates. The precipitate is allowed to settle and is washed with water by decantation until the wash water gives a negative test for sulphates. It is then filtered off and dried. The product is commercially free from iron. The end point is reached when the green color of bromcresol green remains unchanged.

The basic aluminum sulphate produced in accordance with the procedure hereinbefore outlined is substantially free from iron, pure white, easily friable, and is light and soft when disintegrated. It may serve as a constituent of a litho varnish and when so used does not give a "livering" effect.

While the exact formula of the basic aluminum sulphate produced in accordance with this invention is not known, it is believed that the compound so produced has the following formula:

$$Al_4(OH)_{10}SO_4$$

The reactions on the basis of Example 1 illustrating the formation of this basic aluminum sulphate are believed to be as follows:

1. $Al_2Cl_6 + 6NaOH \rightarrow Al_2(OH)_6 + 6NaCl$
2. $Al_2(OH)_6 + 2NaOH \rightarrow Na_2Al_2O_4 + 4H_2O$
3. $2Na_2Al_2O_4 + 3H_2SO_4 + 2H_2O \rightarrow Al_4(OH)_{10}SO_4 + 2Na_2SO_4$ It will be understood, of course, that the invention is in one aspect a process for producing basic aluminum sulphate substantially free from iron by converting the aluminum of an aluminum-containing Friedel-Crafts reaction by-product into a soluble compound, and subsequently precipitating the aluminum as a basic aluminum sulphate by neutralizing the solution with an alkali or an acid depending upon whether the soluble compound is a salt of aluminum or an aluminate. Furthermore, the invention is not limited to the specific compounds or the specific conditions or amounts of ingredients set forth in the examples presented for purposes of illustration, as for example, the caustic soda used may be replaced by an equivalent amount of another alkali, as caustic potash, and the sulphuric acid in Example 3 may be substituted by an equivalent weight of a soluble sulphate. Inasmuch as sulphuric acid may be looked upon as a solution of hydrogen sulphate, the term "soluble sulphate" as herein used includes sulphuric acid. Also, the sodium carbonate which is used to precipitate the basic aluminum sulphate according to the procedure in Example 3 may be substituted by another alkali as caustic soda, caustic potash, potassium carbonate, etc. The term "neutralizing" as used throughout the specification and in the claims refers to the treatment of a solution to reduce the acidity or alkalinity thereof and is not intended to be interpreted strictly to refer to treatment of a solution to bring the pH value thereof to 7.

Since certain changes may be made in carrying out the above process without departing from the scope of the invention, it is intended that all matter contained in the above description shall be interpreted as illustrative and not in a limiting sense.

Having described my invention, what I claim as new and desire to secure by Letters Patent is:

1. The method of obtaining an aluminum compound commercially free from iron from an acidic iron-containing solution of an aluminum compound, which method comprises adjusting the pH of the solution in the presence of a soluble sulphate to between 3½ and 6 whereby a precipitate of basic aluminum sulphate is formed and the iron is present as a solution thereof, and separating the basic aluminum sulphate precipitate from the iron-containing solution.

2. The method of obtaining an aluminum compound commercially free from iron from an acidic iron-containing solution of an aluminum compound, which method comprises adjusting the pH of the solution in the presence of a soluble sulphate to about 5.8 whereby a precipitate of basic aluminum sulphate is formed and the iron is present as a solution thereof, and separating the basic aluminum sulphate precipitate from the iron-containing solution.

3. The method of obtaining an aluminum compound commercially free from iron from an acidic iron-containing solution of an aluminum compound, which method comprises adding to the solution a member of the group consisting of alkali metal hydroxides and normal carbonates in the presence of a soluble sulphate, regulating the addition of hydroxide or carbonate so as to adjust the pH of the solution to between 3½ and 6 whereby a precipitate of basic aluminum sulphate is formed and the iron is present as a solution thereof, and separating the basic aluminum sulphate precipitate from the iron-containing solution.

4. The method of obtaining a basic aluminum sulphate commercially free from iron from basic aluminum carbonate containing iron, which comprises forming an acidic solution of the carbonate containing the iron in solution, adding to the solution a soluble sulphate and a member of the group consisting of alkali metal hydroxides and normal carbonates in sufficient amount to adjust the pH of the solution to between 3½ and 6, whereby a precipitate of basic aluminum sulphate is formed and the iron is retained in solution, and separating the basic aluminum sulphate precipitate from the iron-containing solution.

5. The method of obtaining a basic aluminum sulphate commercially free from iron from an acidic iron-containing solution of an aluminum compound, which method comprises adding a member of the group consisting of alkali metal hydroxides and normal carbonates to the solution in the presence of a soluble sulphate, said sulphate being present in the solution in the ratio represented by the formula $Al_4SO_4$, regulating the amount of hydroxide or carbonate added to adjust the pH of the solution to between 3½ and 6, whereby a precipitate of basic aluminum sulphate is formed and the iron is retained in solution, and separating the basic aluminum sulphate precipitate from the iron-containing solution.

ROBERT ODIORNE WOOD.